United States Patent
Smith

(10) Patent No.: US 9,191,631 B1
(45) Date of Patent: Nov. 17, 2015

(54) ON-DEMAND IMAGE TILE PRODUCTION

(75) Inventor: Brian Hendee Smith, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 981 days.

(21) Appl. No.: 12/685,603

(22) Filed: Jan. 11, 2010

(51) Int. Cl.
*H04N 7/18* (2006.01)

(52) U.S. Cl.
CPC ..................... *H04N 7/181* (2013.01)

(58) Field of Classification Search
CPC ... G01S 13/90; G01S 13/9035; G01S 13/885; G06T 17/05; H01L 2924/00; G06K 9/0063; G06K 9/4604; G01V 99/00; H04N 7/18; H04N 13/0007; H04N 19/167; H04N 1/2133; H04N 1/32101; H04N 2201/3225; H04N 2201/3274; H04N 5/332; A61B 5/0066
USPC .......................... 348/231.2, 231.9
See application file for complete search history.

(56) References Cited

U.S. PATENT DOCUMENTS

| | | | |
|---|---|---|---|
| 4,951,230 A | 8/1990 | Dalrymple et al. | |
| 5,263,136 A | 11/1993 | DeAguiar et al. | |
| 5,905,506 A | 5/1999 | Hamburg | |
| 5,949,429 A | 9/1999 | Bonneau et al. | |
| 5,963,653 A * | 10/1999 | McNary et al. | 382/103 |
| 7,039,241 B1 | 5/2006 | Van Hook | |
| 7,119,811 B2 | 10/2006 | Ernst et al. | |
| 7,148,861 B2 | 12/2006 | Yelton et al. | |
| 7,342,590 B1 | 3/2008 | Danskin et al. | |
| 8,134,489 B2 * | 3/2012 | Smith | 342/25 R |
| 8,274,422 B1 * | 9/2012 | Smith et al. | 342/25 R |
| 8,344,934 B2 * | 1/2013 | Ryland | 342/25 A |
| 2004/0247174 A1 * | 12/2004 | Lyons et al. | 382/154 |
| 2009/0201430 A1 | 8/2009 | Streid et al. | |

* cited by examiner

*Primary Examiner* — Twyler Haskins
*Assistant Examiner* — Carramah J Quiett
(74) *Attorney, Agent, or Firm* — Yee & Associates, P.C.

(57) ABSTRACT

The different advantageous embodiments provide an apparatus for generating an image on-demand comprising a number of sensors, a storage device, and an image formation process. The number of sensors is configured to generate data. The storage device is configured to store the data generated by the number of sensors. The image formation process is configured to receive a number of requests for a number of image regions and generate a number of image tiles using the data at a requested set of parameters.

13 Claims, 4 Drawing Sheets

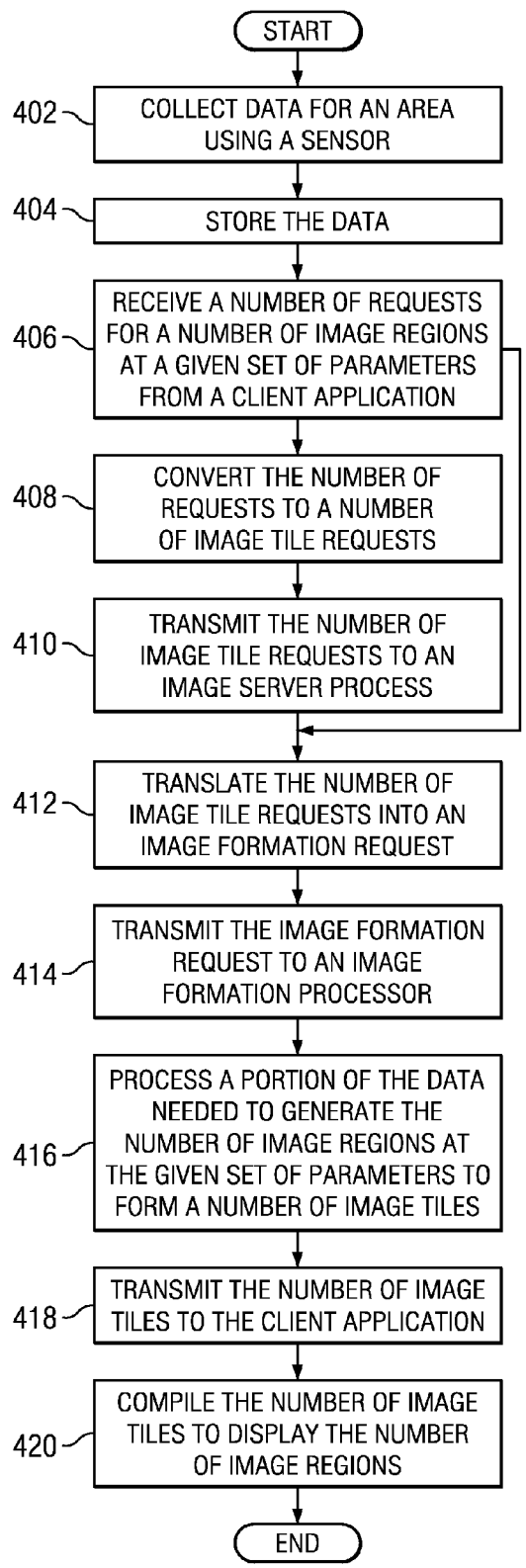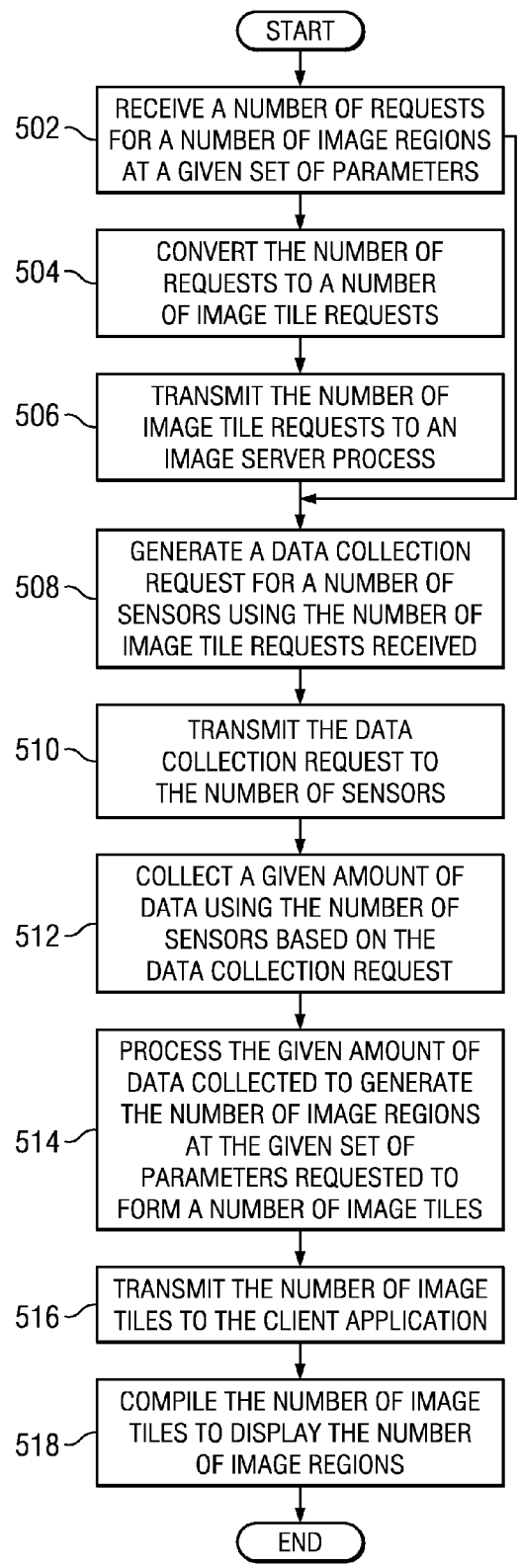

ON-DEMAND IMAGE TILE PRODUCTION

BACKGROUND INFORMATION

1. Field

The present disclosure relates generally to data processing systems and more particularly to a system for image production. Still more particularly, the present disclosure relates to a system for on-demand image tile production.

2. Background

Many types of sensors may be used to collect data, which is in turn used to generate images. One type of sensor may be a synthetic-aperture radar (SAR), a type of radar that produces high-resolution imagery by collecting radio frequency energy from a radar system while the platform moves over some distance. Synthetic-aperture radar may use an antenna mounted on a moving platform, such as an aircraft or spacecraft, to illuminate a target area. Numerous echo waveforms received at the different antenna positions are post-processed to resolve the target. SAR data can be visualized by generating image products using a number of different processing techniques. These processing techniques may vary parameters used in the image formation process, such as display mappings and sidelobe control. These techniques may also incorporate phase information to indicate things such as moving targets, or to increase the resolution through super-resolution techniques. SAR data from multiple passes can be combined together through techniques including interferometry to visualize terrain elevation, temporal changes, or track geophysical phenomena.

Image formation is often supported by large datasets used to generate large digital images, whose dimensions may be many thousands of pixels on a side. Analysts may wish to change processing parameters or generate a different image product based on what is observed in the images. To accomplish these changes, the entire dataset is transferred to the analyst, resulting in large data transfers that consume time and bandwidth, requiring the analyst to have sufficient processing power available on a local workstation. Alternatively, the analyst may make re-processing requests back to a server responsible for generating the images, which are time-consuming as well due to the large volumes of data and computational complexity of the algorithms. The entire image is reprocessed for every new product or change in processing parameters.

The analyst may only need to view a small portion or region of the reprocessed image. To limit the amount of data transferred over the network, the image may be logically segmented into discrete rectangular sub regions, referred to as tiles. When an analyst wishes to view a region of an image, only the tiles necessary to cover the desired region need to be transferred. Existing techniques require that the entire image be reprocessed and segmented prior to transferring the needed tiles.

Therefore, it would be advantageous to have a method and apparatus that takes into account one or more of the issues discussed above, as well as possibly other issues.

SUMMARY

The different advantageous embodiments provide an apparatus for generating an image on-demand comprising a number of sensors, a storage device, and an image formation process. The number of sensors is configured to generate data. The storage device is configured to store the data generated by the number of sensors. The image formation process is configured to receive a number of requests for a number of image regions and generate a number of image tiles using the data at a requested set of parameters.

The different advantageous embodiments further provide a method for generating an image. Data is collected for an area using a sensor. The data is stored in a storage device. A number of requests is received for a number of image regions at a given set of parameters from a client application. In response to receiving the number of requests for the number of image regions, a portion of the data needed to generate the number of image regions at the given set of parameters is processed using an image formation process to form a number of image tiles. The number of image tiles is transmitted to the client application.

The different advantageous embodiments further provide a computer program product stored on a computer readable medium. The computer program product comprises computer usable program code for collecting data for an area using a sensor, storing the data in a storage device, and receiving a number of requests for a number of image regions at a given set of parameters from a client application. Responsive to receiving the number of requests for the number of image regions, the computer program product comprises computer usable program code for processing a portion of the data needed to generate the number of image regions at the given set of parameters using an image formation process to form a number of image tiles, and computer usable code for transmitting the number of image tiles to the client application.

The different advantageous embodiments further provide a method for generating an image. A number of requests for a number of image regions at a given set of parameters is received. A data collection request is generated for a number of sensors using the number of requests received. The data collection request is transmitted to the number of sensors. A given amount of data is collected using the number of sensors based on the data collection request generated. The given amount of data collected is processed to generate the number of image regions at the given set of parameters requested using an image formation process to form a number of image tiles. The number of image tiles is transmitted to the client application.

The features, functions, and advantages can be achieved independently in various embodiments of the present disclosure or may be combined in yet other embodiments, in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 4 is a flowchart illustrating a process for generating an image in accordance with an advantageous embodiment; and FIG. 5 is a flowchart illustrating a process for generating an image in accordance with an advantageous embodiment.

DETAILED DESCRIPTION

Figure 1:
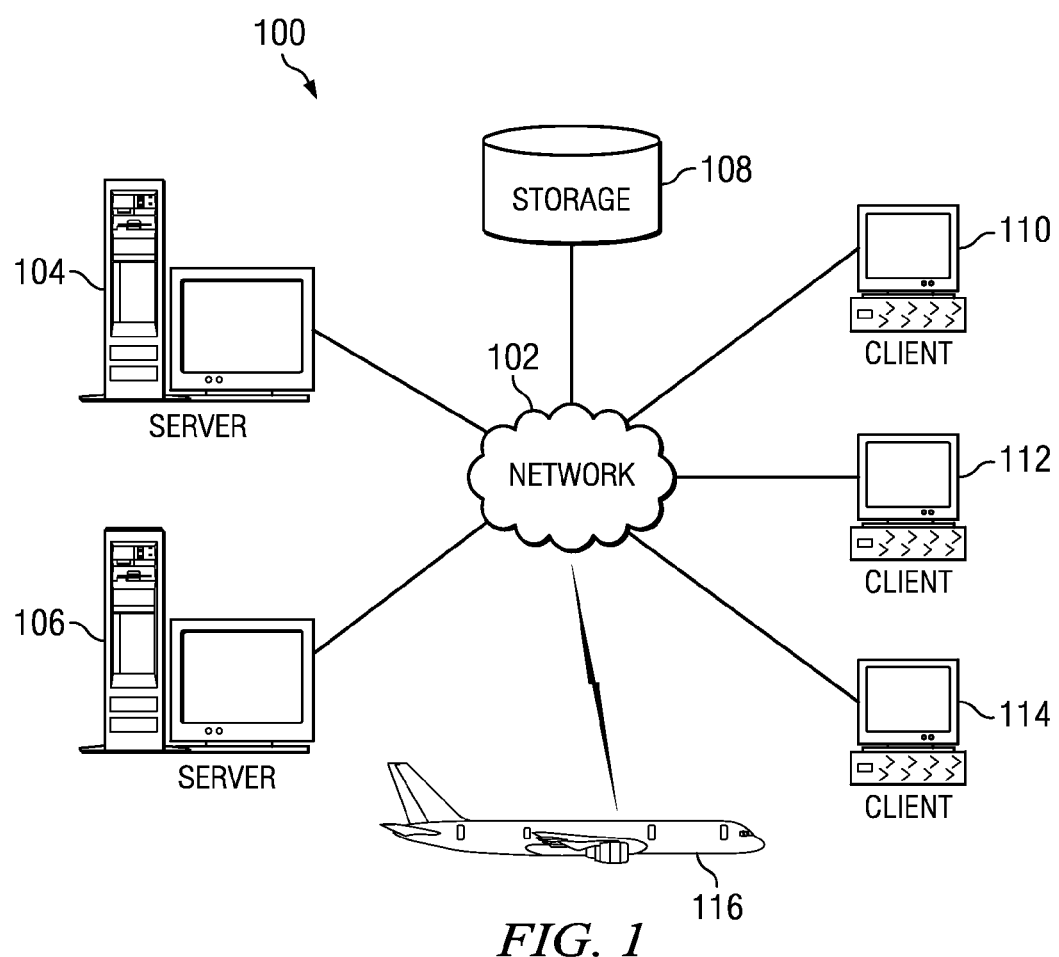
FIG. 1 is an illustration of a network of data processing systems in which the advantageous embodiments may be implemented.
Figure 2:
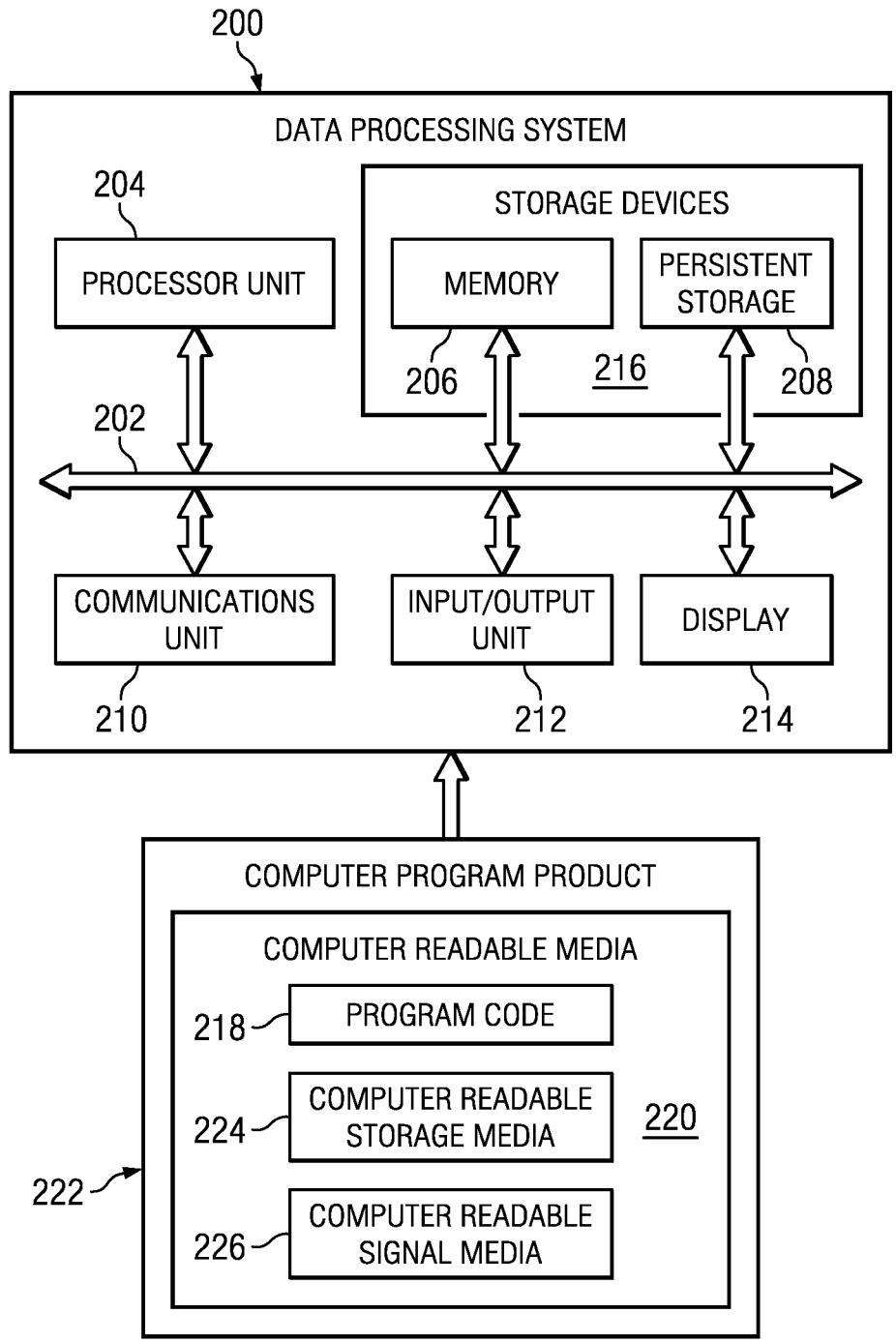
FIG. 2 is an illustration of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitations with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers, connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may include a number of sensors, such as, for example, without limitation, radar antennae. Aircraft 116 may exchange data with different computers through a wireless communications link while in-flight, or any other type of communications link while on the ground. Data may be, for example, without limitation, radar data. In these examples, server 104, server 106, client 110, client 112, and client 114 may be computers. Network data processing system 100 may include additional servers, clients, and other devices not shown. For example, in one advantageous embodiment network data processing system 100 may include a number of antennas distributed throughout network 102. In another illustrative example, server 104, server 106, client 110, client 112, client 114, and/or aircraft 116 may exchange information with a number of antennae distributed throughout network 102 and/or other locations within range of aircraft 116, for example.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as, for example, an intranet, a local area network (LAN), or a wide area network (WAN). FIG. 1 is intended as an example, and not as an architectural limitation for different embodiments.

Turning now to FIG. 2, a diagram of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system, including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C, or item B and item C.

The different advantageous embodiments recognize and take into account a number of different considerations. For example, the different advantageous embodiments recognize and take into account that current methods of image formation send large datasets, or raw data, to the user so that the user can process the data on a local machine. The transfer time of the datasets to the user is time-consuming, often taking hours of time to complete. Additionally, the user may not have enough computational resources to perform the operation from the user workstation. This type of method is only useful for reprocessing existing data, and does not allow a sensor to collect additional data to support image generation.

The different advantageous embodiments further recognize and take into account that current methods of data processing for image formation can be performed over the entire image, or the sensor can collect enough data to make an entire image. The resulting image is then sent to the user or stored for access by a user. When a user desires a different image, or different image parameters, the entire image must be regenerated, consuming time and computational resources in the process.

Thus, the different advantageous embodiments provide an apparatus for generating an image on-demand comprising a number of sensors, a storage device, and an image formation process. The number of sensors is configured to generate data. The storage device is configured to store the data generated by the number of sensors. The image formation process is configured to receive a number of requests for a number of image regions and generate a number of image tiles using the data at a requested set of parameters.

The different advantageous embodiments further provide a method for generating an image. Data is collected for an area using a sensor. The data is stored in a storage device. A number of requests is received for a number of image regions at a given set of parameters from a client application. In response to receiving the number of requests for the number of image regions, a portion of the data needed to generate the number of image regions at the given set of parameters is processed using an image formation process to form a number of image tiles. The number of image tiles is transmitted to the client application.

The different advantageous embodiments further provide a computer program product stored on a computer readable medium. The computer program product comprises computer usable program code for collecting data for an area using a sensor, storing the data in a storage device, and receiving a number of requests for a number of image regions at a given set of parameters from a client application. Responsive to receiving the number of requests for the number of image regions, the computer program product comprises computer usable program code for processing a portion of the data needed to generate the number of image regions at the given set of parameters using an image formation process to form a number of image tiles, and computer usable code for transmitting the number of image tiles to the client application.

The different advantageous embodiments further provide a method for generating an image. A number of requests for a number of image regions at a given set of parameters is received. A data collection request is generated for a number of sensors using the number of requests received. The data collection request is transmitted to the number of sensors. A given amount of data is collected using the number of sensors based on the data collection request generated. The given amount of data collected is processed to generate the number of image regions at the given set of parameters requested using an image formation process to form a number of image tiles. The number of image tiles is transmitted to the client application.

Figure 3:
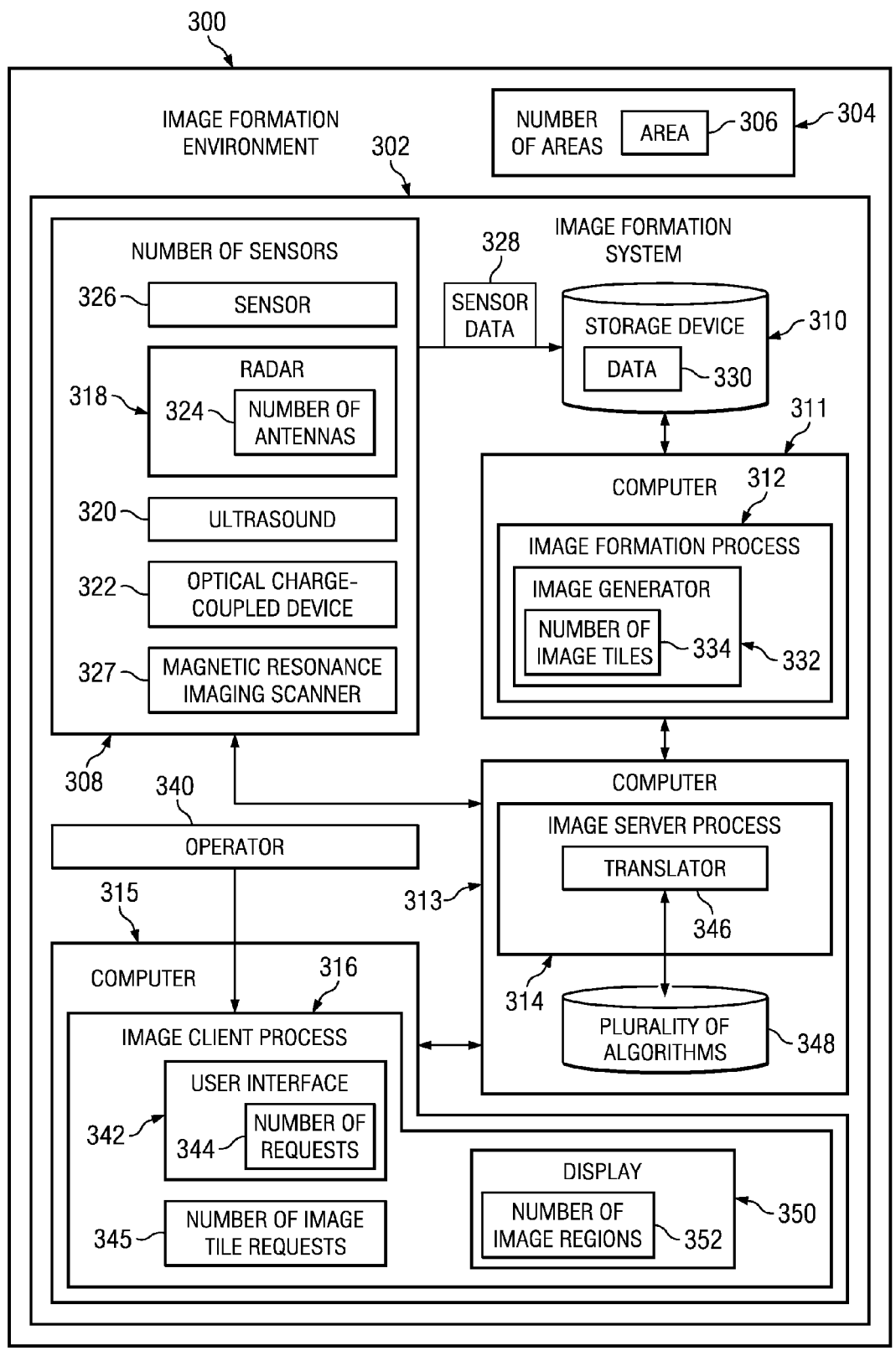
FIG. 3 is an illustration of an image formation environment in accordance with an advantageous embodiment.

FIG. 3 is an illustration of an image formation environment in accordance with an advantageous embodiment. Image formation environment 300 may be implemented in a network environment, such as network 102 of network data processing system 100 in FIG. 1, for example.

Image formation environment 300 includes image formation system 302. Image formation system 302 may be used in and/or near number of areas 304. Number of areas 304 may include at least one of air, space, land, sea, submarine, subterranean, and/or any other suitable area. Area 306 may be an illustrative example of one of number of areas 304.

Image formation system 302 may include number of sensors 308, storage device 310, image formation process 312, image server process 314, and image client process 316. Number of sensors 308 may be any type of sensor capable of generating data associated with number of areas 304. Data may include, for example, without limitation, image data, radar data, sonar data, ultrasonic data, electrical data, and/or any other suitable type of data. Number of sensors 308 may include, for example, without limitation, radar 318, ultrasound 320, optical charge-coupled device 322, sensor 326, magnetic resonance imaging (MRI) scanner 327 and/or any other suitable sensor for generating data. Radar 318 may be, for example, without limitation, a synthetic-aperture radar (SAR). Radar 318 may include number of antennas 324. As used herein, the phrase "number of" refers to one or more antennas.

Optical charge-coupled device 322 may be a device integrated with a sensor, such as a photoelectric device, that produces and monitors the movement of an electrical charge. The electrical charge usually moves from within the device to an area where the charge can be manipulated, for example conversion into a digital value. This movement is achieved by shifting the signals between stages within the device one at a time. Optical charge-coupled device 322 may be used where the conversion of images into a digital signal is required, for example.

Sensor 326 may be an illustrative example of one type of number of sensors 308. Sensor 326 collects sensor data 328 and stores sensor data 328 in storage device 310 as data 330. In one illustrative example, where sensor 326 is an illustrative implementation of radar 318 and sensor data 328 is a collection of datasets of synthetic aperture radar data, data 330 may include electromagnetic measurements that are capable of being processed by image formation process 312 in a number of ways to produce imagery.

Image formation process 312 is executed by computer 311. Computer 311 may be an illustrative example of one implementation of data processing system 200 in FIG. 2. Image formation process 312 includes image generator 332. Image generator 332 processes data 330 to generate number of image tiles 334.

Operator 340 may be, for example, without limitation, a human user, a software program, and/or any other suitable operator. Operator 340 accesses image client process 316 via user interface 342. Image client process 316 may be any type of client application capable of compiling image tiles to display image regions, for example. Image client process 316 compiles a number of image tiles generated by image generator 332 to display a number of image regions requested by operator 340. Image client process 316 may compile image tiles using a number of methods, including, without limitation, mosaic, stitching, overlay, and/or any other suitable method.

In an illustrative example, image client process 316 may be a stand-alone application or a plug-in for a web-browser. Image client process 316 allows operator 340 to select the type of processing to be applied to data 330 in order to create number of image regions 352. Operator 340 may select a set of parameters as the type of processing to be applied to data 330, for example, using number of requests 344. A set of parameters may be selected from at least one of a location, resolution, image size, specified algorithm parameters, any combination of these, and/or any other suitable parameter for image formation. Image client process 316 also allows operator 340 to zoom and pan through number of image regions 352 after number of image tiles 334 has been transmitted to image client process 316 for compilation and display via display 350.

Image client process 316 uses the requested processing parameters, along with any zoom and pan locations, to generate number of image tile requests 345. Number of image tile requests 345 identify the image tiles necessary to render the display of an image region or number of image regions according to the requested processing parameters. Image client process 316 transmits number of image tile requests 345 to image formation process 312 via image server process 314.

Number of image tiles 334 are subregions of a full image, and may be of lower resolution than the full image. Image client process 316 compiles and interpolates number of image tiles 334 prior to displaying them to operator 340 via display 350 as number of image regions 352. As operator 340 zooms and pans through number of image regions 352, image client process 316 dynamically requests appropriately processed imagery tiles from image server process 314 to support the requested region and zoom-level, or resolution, to be displayed. Number of requests 344 represent the request for an image region or number of image regions by operator 340, including operator-specific processing parameters. Number of image tile requests 345 represents the dynamic requests image client process 316 transmits to image formation process 312 via image service process 314 as operator 340 zooms and pans through number of image regions 352.

Upon receiving number of image tile requests 345, image server process 314 processes only the portions of data 330 needed to generate the requested number of image tiles with the requested processing algorithms. The requested processing algorithms may be identified using the set of parameters received in the request, for example. As the requested processing algorithm or algorithm parameters are changed, such as when operator 340 zooms and pans through number of image regions 352, for example, only a small portion of the data needs to be reprocessed to support the display of number of image regions 352 over image client process 316.

Image client process 316 may be executed by computer 315. Computer 315 may be an illustrative example of one implementation of data processing system 200 in FIG. 2. Operator 340 submits number of requests 344 to image client process 316 via user interface 342. Number of requests 344 may include a set of parameters for image formation, for example. In one illustrative example, number of requests 344 may be a request for a portion of an image at a specified screen resolution, directed to image formation process 312. In another illustrative example, number of requests 344 may include algorithms and/or a set of parameters identifying a given resolution and location of a requested number of image regions while zooming and panning.

Number of image tile requests 345 is received by image server process 314. Image server process 314 may be executed by computer 313. Computer 313 may be an illustrative example of one implementation of data processing system 200 in FIG. 2. Image server process 314 includes translator 346. Translator 346 parses number of image tile requests 345, and generates an image formation request for image formation process 312. In one illustrative example, translator 346 may generate algorithm schedules and/or algorithm parameters for use by image formation process 312 to render an image in a requested resolution or location. In another illustrative example, translator 346 may access plurality of algorithms 348 stored in computer 313 and associated with a requested resolution or location identified in number of image tile requests 345. In another illustrative example, translator 346 may generate a request for a number of sensors 308 to collect data associated with a requested resolution or location identified in number of image tile requests 345.

Image formation process 312 receives the translated request from image server process 314 and processes data 330 from storage device 310 to generate number of image tiles 334 for the requested parameters, such as location and screen resolution, for example. If the appropriate data needed to generate number of image tiles 334 is not already stored in storage device 310, image server process 314 may send a request to number of sensors 308 to collect additional sensor data 328. Once generated, number of image tiles 334 is transmitted back to image server process 314, and image server process 314 transmits number of image tiles 334 to image client process 316. Image client process 316 combines number of image tiles 334 and renders results to display 350 as number of image regions 352. Operator 340 may view number of image regions 352 via display 350.

The illustration of image formation environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 4, a flowchart illustrating a process for generating a number of image tiles is depicted in accordance with an advantageous embodiment. The process in FIG. 4 may be implemented by a component such as image formation system 302 in FIG. 3, for example.

The process begins by collecting data for an area using a sensor (operation 402). The data may be, for example, sensor data. The process stores the data (operation 404). The data is stored in a storage device, such as storage device 310 in FIG. 3, for example.

The process then receives a number of requests for a number of image regions at a given set of parameters from a client application (operation 406). The request may be received by an image client process, such as image client process 316 in FIG. 3, for example. The request may include a set of parameters specifying a resolution, location, image size, and/or algorithm parameters desired for the image, for example. The image generation or formation does not occur until a request is presented, at which time the image formation is generated on demand using stored data.

The process converts the number of requests to a number of image tile requests (operation 408). This conversion may be performed by an image client process, such as image client process 316 in FIG. 3. The process then transmits the number of image tile requests to an image server process (operation 410).

The process translates the number of image tile requests into an image formation request (operation 412). The process may translate a request to parse a client protocol's image tile request and generate an image processing request which may include an algorithm schedule and/or specific algorithm parameters, in one illustrative example. In another illustrative example, operation 412 may be omitted where the image tile request includes an algorithm schedule and/or specific algorithm parameters. The process transmits the image formation request to an image formation processor (operation 414).

The process processes a portion of the data needed to generate the number of image regions at the given set of parameters to form a number of image tiles (operation 416). The process then transmits the number of image tiles to the client application (operation 418). The process compiles the number of image tiles to display the number of image regions (operation 420), with the process terminating thereafter.

The process illustrated in FIG. 4 is not meant to imply physical or architectural limitations to the manner in which different advantageous embodiments may be implemented. Other operations in addition to and/or in place of the ones illustrated may be used. Some operations may be unnecessary in some advantageous embodiments, such as operation 408, for example. One or more of these operations may be combined and/or divided into different operations when implemented in different advantageous embodiments.

With reference now to FIG. 5, a flowchart illustrating a process for generating a portion of an image is depicted in accordance with an advantageous embodiment. The process in FIG. 5 may be implemented by a component such as image formation system 302 in FIG. 3, for example.

The process begins by receiving a number of requests for a number of image regions at a given set of parameters (operation 502). The request may be received by an image client process, such as image client process 316 in FIG. 3, for example. The given set of parameters may include, for example, without limitation, any combination of at least one of a location, resolution, image size, and specified algorithm parameters.

The process converts the number of requests to a number of image tile requests (operation 504). This conversion may be performed by an image client process, such as image client process 316 in FIG. 3. The process then transmits the number of image tile requests to an image server process (operation 506).

The process then generates a data collection request for a number of sensors using the number of image tile requests received (operation 508). The process transmits the data collection request to the number of sensors (operation 510). The number of sensors may include at least one of a radar, an ultrasound machine, a magnetic resonance imaging scanner, and a charge-coupled device, for example.

The process then collects a given amount of data using the number of sensors based on the data collection request generated (operation 512). The data collected may be sensor data, for example. The process next processes the given amount of data collected to generate the number of image regions at the given set of parameters requested using an image formation process to form a number of image tiles (operation 514). The process then transmits the number of image tiles to the client application (operation 516). The process compiles the number of image tiles to display the number of image regions (operation 518), with the process terminating thereafter.

The process illustrated in FIG. 5 is not meant to imply physical or architectural limitations to the manner in which different advantageous embodiments may be implemented. Other operations in addition to and/or in place of the ones illustrated may be used. Some operations may be unnecessary in some advantageous embodiments. One or more of these operations may be combined and/or divided into different operations when implemented in different advantageous embodiments.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer-readable medium can generally be any tangible apparatus that can contain, store, communicate, propagate, or transport the program for use by or in connection with the instruction execution system, apparatus, or device.

The computer-usable or computer-readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer-readable or usable program code such that when the computer-readable or usable program code is executed on a computer, the execution of this computer-readable or usable program code causes the computer to transmit another computer-readable or usable program code over a communications link. This communications link may use a medium that is, for example without limitation, physical or wireless.

A data processing system suitable for storing and/or executing computer-readable or computer-usable program code will include one or more processors coupled directly or indirectly to memory elements through a communications fabric, such as a system bus. The memory elements may include local memory employed during actual execution of the program code, bulk storage, and cache memories, which provide temporary storage of at least some computer-readable or computer-usable program code to reduce the number of times code may be retrieved from bulk storage during execution of the code.

Input/output or I/O devices can be coupled to the system either directly or through intervening I/O controllers. These devices may include, for example, without limitation, keyboards, touch screen displays, and pointing devices. Different communications adapters may also be coupled to the system to enable the data processing system to become coupled to other data processing systems or remote printers or storage devices through intervening private or public networks. Non-limiting examples of modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for generating an image, the method comprising:
   collecting data for an area using a sensor, wherein the data comprises a plurality of raw information items associated with the area, the data further comprising synthetic aperture radar (SAR) data;
   storing the data in a storage device;
   receiving a number of requests for a number of image regions at a given set of parameters from a client application;
   responsive to the number of requests, identifying SAR data associated with the number of requests;
   processing only a selective portion of the SAR data associated with the number of requests, the selective portion being a minimum necessary to generate the number of image regions at the given set of parameters using an image formation process to form a number of image tiles, wherein the image formation process retrieves only the selective portion of the SAR data from the storage device, and wherein the selective portion is less than all of the SAR data, whereby, by processing only the selective portion, time and computational resources are saved relative to processing all of the SAR data;
   transmitting the number of image tiles to the client application; and
   compiling the number of image tiles using the client application to display the number of image regions.

2. The method of claim 1 further comprising:
   converting the number of requests to a number of image tile requests;
   transmitting the number of image tile requests to an image server process;
   translating the number of image tile requests into an image formation request; and
   transmitting the image formation request to an image formation processor to process the portion of data needed to generate the number of image regions at the given set of parameters.

3. The method of claim 1, wherein the sensor is selected from at least one of a radar, an ultrasound machine, a magnetic resonance imaging scanner, and a charge-coupled device.

4. The method of claim 1, wherein the given set of parameters is selected from at least one of a location, resolution, image size, and specified algorithm parameters.

5. The method of claim 1 further comprising:
collecting additional SAR data from the sensor based on the number of requests; and
transmitting the additional SAR data to the storage device, wherein the selective portion includes portions of both the SAR data and the additional SAR data.

6. An apparatus for generating an image on-demand, the apparatus comprising:
a number of sensors configured to generate data, wherein the data comprises a plurality of raw information items associated with the area, the data further comprising synthetic aperture radar (SAR) data;
a storage device configured to store the data generated by the number of sensors;
an image formation process configured to receive a number of requests for a number of image tiles and generate the number of image tiles using the data at a requested set of parameters;
an image server process configured to receive a number of image tile requests for a number of image regions from an image client process and convert the number of image tile requests into an image formation request;
wherein the image server process is configured to transmit the image formation requests to the image formation process;
wherein the image server process is configured to translate the number of image tile requests to identify the requested set of parameters for the number of image regions requested and to associate a number of algorithms with the image formation request configured to be used by the image formation process in generating the number of image tiles at the requested set of parameters; and
wherein the image server process is configured to, responsive to the number of requests, generate a data collection request for a number of sensors using the number of requests received;
wherein the image server process is configured to collect additional SAR data from the number of sensors based on the number of requests, and transmitting the additional SAR data to the storage device;
wherein the image server process is configured to process only a portion of the data, the portion being a minimum necessary to generate the requested number of image tiles with the number of algorithms, and wherein the portion of the data is less than all of the data; and
wherein the image server process is further configured to extract only the portion of the SAR data and the additional SAR data from the storage device, and wherein the portion is less than all of the SAR data and the additional SAR data.

7. The apparatus of claim 6, wherein the requested set of parameters is selected from at least one of a location, resolution, image size, and specified algorithm parameters.

8. The apparatus of claim 6, wherein the number of sensors is selected from at least one of a radar, an ultrasound machine, and a charge-coupled device.

9. A non-transitory computer readable medium storing a computer program product, the computer program product comprising:
a model manager configured computer usable program code for collecting data for an area using a sensor, wherein the data comprises a plurality of raw information items associated with the area, the data further comprising synthetic aperture radar (SAR) data;
computer usable program code for storing the data in a storage device;
computer usable program code for receiving a number of requests for a number of image regions at a given set of parameters from a client application;
computer usable program code for, responsive to the number of requests, generating a data collection request for the sensor using the number of requests received;
computer usable program code for collecting additional SAR data from the sensor based on the number of requests, and transmitting the additional SAR data to the storage device;
computer usable program code for processing only a portion of the SAR data and the additional SAR data, the portion being a minimum necessary to generate the number of image regions at the given set of parameters using an image formation process to form a number of image tiles, and to retrieve only the portion of the SAR data and the additional SAR data from the storage device, and wherein the portion is less than all of the SAR data and the additional SAR data;
computer usable program code for processing only the portion of the data, the portion being a minimum necessary to generate the number of image regions at the given set of parameters to form a number of image tiles;
computer usable program code to combine the number of image tiles newly processed and the number of image tiles retrieved from the data in the storage device; and
computer usable program code for transmitting the number of image tiles to the client application.

10. The non-transitory computer readable medium of claim 9 further comprising:
computer usable program code for compiling the number of image tiles using the client application to display the number of image regions.

11. The non-transitory computer readable medium of claim 9, wherein the sensor is selected from at least one of a radar, an ultrasound machine, and a charge-coupled device.

12. The non-transitory computer readable medium of claim 9, further comprising:
computer usable program code for, responsive to receiving a number of image tile requests from an image client process, converting a number of image tile requests into an image formation request; and
computer usable program code for transmitting the image formation request to the image formation process.

13. The non-transitory computer readable medium of claim 9, wherein the given set of parameters is selected from at least one of a location, resolution, image size, and specified algorithm parameters.

* * * * *